(12) United States Patent
Stapleton (10) Patent No.: US 10,746,608 B2
(45) Date of Patent: Aug. 18, 2020

(54) PHOTOLUMINESCENT THERMOMETRIC TARGET

(71) Applicant: LumaSense Technologies Holdings, Inc., Santa Clara, CA (US)

(72) Inventor: Terry M. Stapleton, Santa Clara, CA (US)

(73) Assignee: LumaSense Technologies Holdings, Inc., Santa Clara, CA (US)

( * ) Notice: Subject to any disclaimer, the term of this patent is extended or adjusted under 35 U.S.C. 154(b) by 134 days.

(21) Appl. No.: 15/885,315

(22) Filed: Jan. 31, 2018

(65) Prior Publication Data

US 2018/0274987 A1    Sep. 27, 2018

Related U.S. Application Data

(60) Provisional application No. 62/474,673, filed on Mar. 22, 2017.

(51) Int. Cl.
*G01K 11/12* (2006.01)
*G01K 11/20* (2006.01)
(Continued)

(52) U.S. Cl.
CPC ............... *G01K 11/12* (2013.01); *C09D 5/22* (2013.01); *C09D 5/26* (2013.01); *C09K 5/14* (2013.01); *C09K 11/02* (2013.01); *G01K 11/20* (2013.01)

(58) Field of Classification Search
CPC ..... G01K 11/20; G01K 11/3213; G01N 21/35
(Continued)

(56) References Cited

U.S. PATENT DOCUMENTS 4,215,275 A     7/1980  Wickersheim
4,895,156 A *   1/1990  Schulze ............... A61B 5/1459
                                                        250/458.1
(Continued)

FOREIGN PATENT DOCUMENTS

CN       2592766 Y    12/2003
CN     101268346 A     9/2008
(Continued)

OTHER PUBLICATIONS

Office Action issued in Chinese Application No. 201810235701.1, dated Sep. 20, 2019 (9 pages).
(Continued)

*Primary Examiner* — Gail Kaplan Verbitsky
(74) *Attorney, Agent, or Firm* — Osha Liang LLP (57) ABSTRACT

A system for obtaining temperature measurements. The system includes a photoluminescent target. The photoluminescent target includes a photoluminescent coating and a thermally conductive skeleton. The photoluminescent coating, when exposed to excitation light received from an interrogation unit, reemits light in a temperature-dependent manner, and the interrogation unit obtains a temperature measurement based on the reemitted light. The thermally conductive skeleton structure is configured to establish an even temperature distribution across the photoluminescent target, and to provide a support matrix for the photoluminescent coating that surrounds the skeleton structure. The photoluminescent target thermally interfaces with a target body from which the temperature measurement is to be obtained.

10 Claims, 6 Drawing Sheets

(51) Int. Cl.
*C09D 5/22* (2006.01)
*C09D 5/26* (2006.01)
*C09K 5/14* (2006.01)
*C09K 11/02* (2006.01)

(58) Field of Classification Search
USPC .................. 374/121, 130, 161, 162, 131
See application file for complete search history.

(56) References Cited

U.S. PATENT DOCUMENTS

| | | | | | |
|---|---|---|---|---|---|
| 5,062,686 | A | * | 11/1991 | Barrow | G01D 5/268 |
| | | | | | 385/123 |
| 5,112,137 | A | * | 5/1992 | Wickersheim | G01J 1/58 |
| | | | | | 374/131 |
| 5,183,338 | A | * | 2/1993 | Wickersheim | G01J 1/58 |
| | | | | | 374/131 |
| 5,273,359 | A | * | 12/1993 | Noel | G01K 17/20 |
| | | | | | 374/29 |
| 5,705,821 | A | * | 1/1998 | Barton | G01B 11/20 |
| | | | | | 250/458.1 |
| 5,928,222 | A | * | 7/1999 | Kleinerman | G01J 5/08 |
| | | | | | 374/E11.017 |
| 2006/0140248 | A1 | * | 6/2006 | Gotthold | G01J 5/0003 |
| | | | | | 374/161 |
| 2015/0034147 | A1 | * | 2/2015 | Le Perchec | H01L 31/055 |
| | | | | | 136/251 |
| 2018/0326693 | A1 | * | 11/2018 | Kuniyasu | B32B 3/02 |

FOREIGN PATENT DOCUMENTS

| | | | |
|---|---|---|---|
| DE | 3804289 A | * | 8/1989 |
| JP | H10-48063 A | | 2/1998 |

OTHER PUBLICATIONS

Office Action issued in corresponding Japanese Application No. 2018-053870 dated Jun. 11, 2019, and English translation thereof (8 pages).
Office Action issued in corresponding CA Application No. 2,998,762 dated Feb. 1, 2019 (3 pages).
Office Action issued in corresponding Canadian Application No. 2,998,762, dated Mar. 9, 2020 (4 pages).

* cited by examiner

PHOTOLUMINESCENT THERMOMETRIC TARGET

CROSS-REFERENCE TO RELATED APPLICATIONS

This Application claims the benefit of U.S. Provisional Application 62/474,673 filed on Mar. 22, 2017 and entitled "PHOTOLUMINESCENT THERMOMETRIC TARGET", the entire disclosure of which is hereby expressly incorporated by reference herein.

BACKGROUND

Temperature dependence of certain photoluminescent materials may be exploited to measure temperatures. An interrogation unit may expose a photoluminescent target to light, and in response to the light exposure, and depending on the temperature, the photoluminescent target may respond by reemitting light with particular characteristics. This reemitted light may be received by the interrogation unit, and based on the characteristics of the reemitted light, the temperature of the photoluminescent target may be estimated.

SUMMARY

In general, in one aspect, the invention relates to a system for obtaining temperature measurements. The system includes a photoluminescent target. The photoluminescent target includes a photoluminescent coating that, when exposed to excitation light received from an interrogation unit, reemits light in a temperature-dependent manner. The system further includes a thermally conductive skeleton structure configured to establish an even temperature distribution across the photoluminescent target, and provide a support matrix for the photoluminescent coating that surrounds the skeleton structure. The photoluminescent target thermally interfaces with a target body from which the temperature measurement is to be obtained, and the interrogation unit obtains a temperature measurement based on the reemitted light.

In general, in one aspect, the invention relates to a method for manufacturing a photoluminescent target. The method includes obtaining a liquid photoluminescent coating that includes a photoluminescent material and a binder, coating a thermally conductive skeleton structure with the liquid photoluminescent coating, disposing the coated skeleton structure on a substrate, and curing the liquid photoluminescent coating to obtain a non-liquid photoluminescent coating that encloses the skeleton structure and adheres to the substrate.

In general, in one aspect, the invention relates to a method for manufacturing photoluminescent targets. The method includes spreading a thermally conductive skeleton structure sheet in a mold, obtaining a liquid photoluminescent coating that includes a photoluminescent material and a binder, filling the liquid photoluminescent coating into the mold to enclose the skeleton structure sheet, curing the liquid photoluminescent coating to obtain a non-liquid photoluminescent coating that encloses the skeleton structure sheet, in the mold, and extracting skeleton structures, coated with the cured photoluminescent coating, from the skeleton structure sheet enclosed by the cured photoluminescent coating.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6E, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to temperature measurements. Temperature measurements may be performed using various technologies. These technologies may exploit the temperature dependency of a material's physical, electrical or radiant properties. Examples include, but are not limited to, mercury thermometers, thermocouples, resistance temperature detectors, thermistors, pyrometers and photoluminescence-based thermometers.

While electrical temperature sensors may be unsuitable for temperature measurements in electromagnetically noisy environments due to their undesirable sensitivity to electromagnetic radiation, and while pyrometer-type sensors may not be usable if emissivity or line-of-sight difficulties exist, photoluminescent thermometry is immune to electromagnetic interference (EMI) and does not necessarily require line-of-sight coupling, e.g., if fiberoptics are used.

In one or more embodiments of the invention, an interrogation unit exposes a photoluminescent target to light, and in response to the light exposure, and depending on the temperature, the photoluminescent target responds by reemitting light in a temperature-dependent manner. The reemitted light may be received by the interrogation unit, and based on the characteristics of the reemitted light, the temperature of the photoluminescent target may be estimated. Accordingly, if a photoluminescent target thermally interfaces with a target body, the temperature of the target body may be estimated from the reemitted light received by the interrogation unit.

Figure 1A:
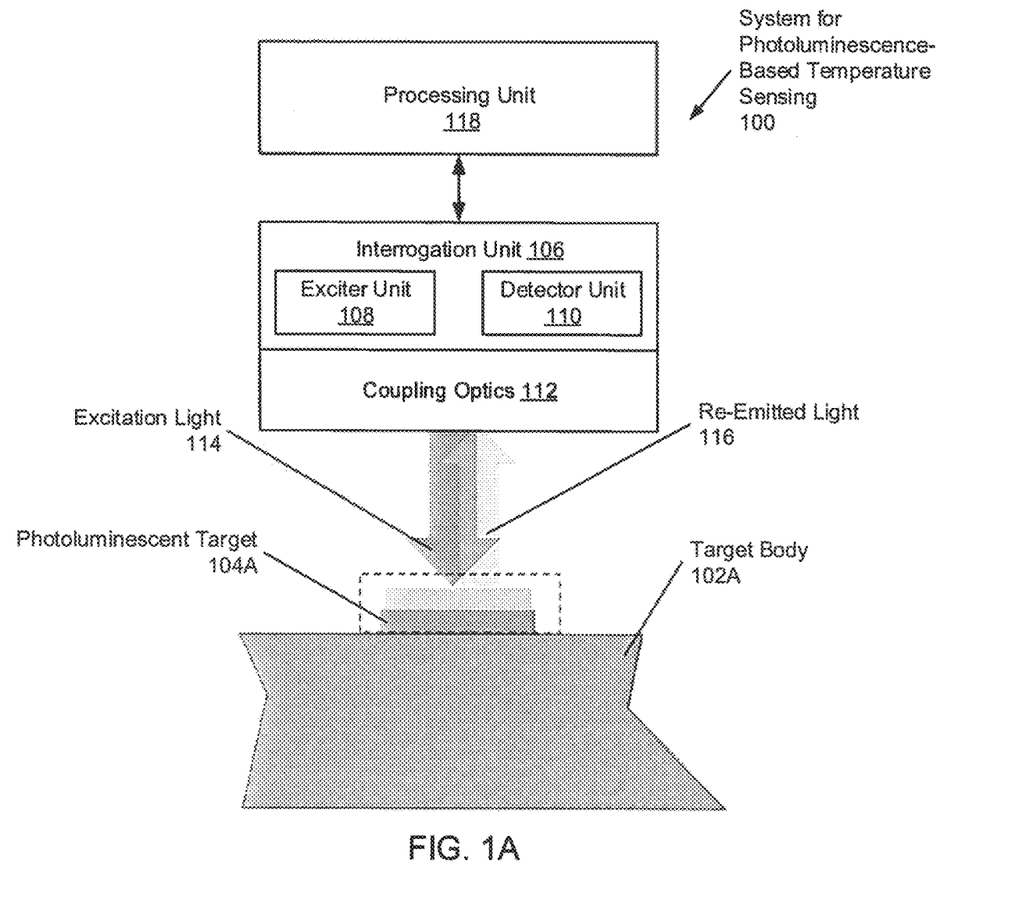
FIG. 1A shows a schematic diagram of a photoluminescence-based thermometer, configured to measure the temperature of a target body, in accordance with one or more embodiments of the invention.

FIG. 1A schematically shows a system for photoluminescence-based temperature sensing (100), in accordance with one or more embodiments of the invention. The system for photoluminescence-based temperature sensing (100) may be used to determine the temperature of a target body (102A). The target body (102A) may be any object to which a photoluminescent target (104A) can be attached in thermal contact. The system for photoluminescence-based temperature sensing (100) may include a photoluminescent target (104A), an interrogation unit (106), coupling optics (112) and a processing unit (118). Each of these components is subsequently described.

In one or more embodiments of the invention, the photoluminescent target (104A) is exposed to the thermal environment to be measured. More specifically, the photoluminescent target (104A) may be attached to a surface of a target body (102A) whose temperature is to be determined. The photoluminescent target (104A) may be attached to the surface of the target body using an adhesive. The adhesive may be thermally conductive. The adhesive may further be reflective (e.g., in case of a white adhesive being used) to further improve emission intensity to the coupling optics. A detailed description of the photoluminescent target (104A) is provided below with reference to FIGS. 2A-3B.

The photoluminescent target (104A), in accordance with one or more embodiments of the invention, is interrogated by an interrogation unit (106). The interrogation units emits excitation light (114). The photoluminescent target (104A) receives the excitation light (114) and in response re-emits light (116) whose characteristics depend on the temperature of the photoluminescent target (104A).

The interrogation unit (106) includes an exciter unit (108) and a detector unit (110). The exciter (108) unit may be a light source, used to provide the excitation light (114) to the photoluminescent target (104A) during a temperature measurement of the target body (102A). The detector unit (110) may be a light sensing device, used to capture and measure light re-emitted by the photoluminescent target (104A) in response to the excitation light.

The exciter unit (108) may be, a light source, e.g. a lamp, an LED, a laser, etc., capable of causing the photoluminescent target (104A) to respond by re-emitting light. The excitation light (114) provided by the exciter unit (108) may be, for example of a particular wavelength, intensity, polarity, and may be provided for a particular duration, etc., as determined by the photoluminescent substance in the photoluminescent target (104A).

The detector unit (110) may be any type of detector suitable for the detection of light re-emitted by the photoluminescent target (104A), e.g., the detector may be a photodiode, phototransistor, photoresistor, CCD array, CMOS array, etc. The output signal of the detector unit (110) may be governed by the light that is re-emitted by the photoluminescent target (104A). The output signal may be, for example, a voltage, a current, or a digital signal that may be linearly or nonlinearly related to characteristics of the re-emitted light (116).

Exciter unit (108) and detector unit (110) may directly face the photoluminescent target (104A), e.g., in a system designed for line-of-sight operation. Alternatively, coupling optics (112) may be used. The coupling optics may include any combination of optical elements including lenses, mirrors, optical waveguides such as optical fibers, etc., without departing from the invention. The coupling optics may be configured to accommodate a variety of environmental conditions, spatial requirements, etc.

Continuing with the discussion of the system for photoluminescence-based temperature sensing, the processing unit (118) may be configured to generate a temperature estimate, based on the signal received from the detector unit. The processing unit (118) may be any type of computing device or devices that includes at least the minimum processing power, memory, and input and output device(s) to perform one or more embodiments of the invention. In one embodiment of the invention, the processing unit (118) may form a single unit with the interrogation unit (106). For example, the processing unit and the interrogation unit may be housed in a probe. The processing unit may further be integrated with the interrogation unit (106) on a single printed circuit board. The processing unit (118) may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities, such as input and output device enabling a user to interact with the processing unit. The processing unit (118) may further be connected to a network (e.g., a company's local area network (LAN), a wide area network (WAN) such as the Internet, mobile networks, or any other type of network via a network interface connection. In one embodiment of the invention, the processing unit (118) further includes a communication interface for communicating with the interrogation unit (106). The communication with the interrogation unit may include sending control commands to the exciter unit (108) and receiving data from the detector unit (110). Depending on the connectivity of the interrogation unit (106), the communication interface may include a digital interface, such as USB, RS232, etc. and/or an analog interface, for example via analog-to-digital and digital-to-analog converters.

Figure 1B:
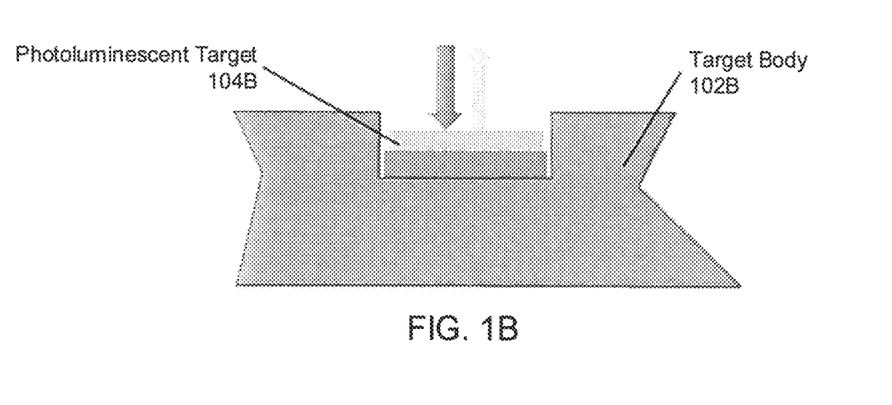
FIG. 1B shows a schematic diagram of a photoluminescent target installed on a target body, in accordance with one or more embodiments of the invention.

FIG. 1B shows an alternative embodiment of the invention, in which the photoluminescent target (104B) is placed in a recess of the target body (102B). The recess may form a thermal well in which a particularly even temperature distribution can be ensured. Further, the recessed placement of the target body may provide some degree of environmental protection for the photoluminescent target. For example, the exposure to drafts and ambient light may be reduced. Aside from the recessed placement of the photoluminescent target, the embodiment of the invention may be similar to the embodiment shown in FIG. 1A.

Figures 2A, 2B:
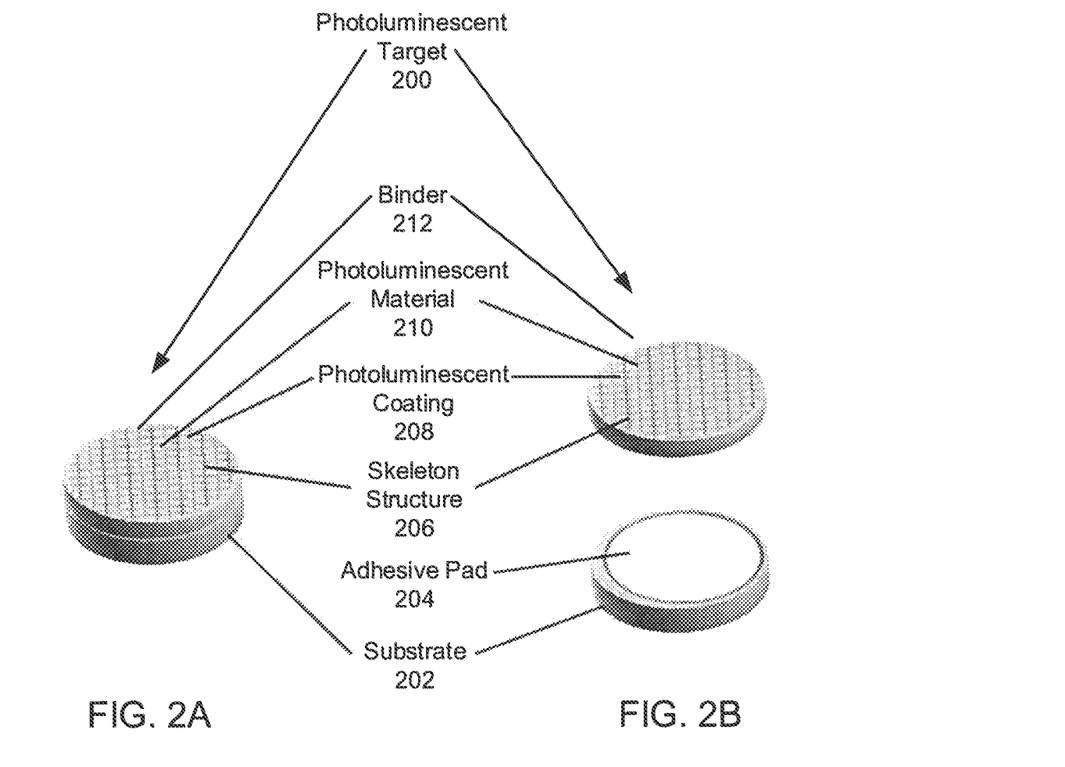
FIGS. 2A and 2B show photoluminescent targets, in accordance with one or more embodiments of the invention.

FIGS. 2A and 2B show photoluminescent targets in accordance with one or more embodiments of the invention. While FIG. 2A shows the assembled photoluminescent target, FIG. 2B shows various elements of the photoluminescent target prior to its assembly. The photoluminescent target (200) includes a substrate (202), a skeleton structure (206) and a photoluminescent coating (208). Depending on the method used for manufacturing the photoluminescent target (200), the photoluminescent target may or may not include an adhesive pad (204). Each of these elements is subsequently described. Further, the manufacturing of photoluminescent targets in accordance with various embodiments of the invention is described with reference to FIGS. 4A-6E.

The substrate (202), in accordance with an embodiment of the invention, serves as a base for the photoluminescent coating (208) and the skeleton structure (206). The substrate (202) may be a disc of any size and shape and may be made of a thermally conductive material, such as aluminum, copper, stainless steel, etc. However, any other material, including metals, ceramics, plastics, etc. may alternatively be used, without departing from the invention. The substrate (202) may be attached to a target body, thereby establishing thermal contact between the substrate and the target body, as previously illustrated in FIGS. 1A and 1B. Any kind of thermally conductive organic or inorganic adhesive may be used to establish an intimate contact between the substrate and the target body. Alternatively, the thermal contact may be obtained using other mechanical mounting options including screws, rivets, etc.

In one embodiment of the invention, no substrate may be used. In such an embodiment, the skeleton structure (206) with the photoluminescent coating (208) is directly attached to the target body.

The skeleton structure (206), in accordance with an embodiment of the invention, forms a support matrix that enables the photoluminescent coating (208) to attach. Further, in one or more embodiments of the invention, the skeleton structure (206) is thermally conductive thus facilitating the equalization of the temperature across the photoluminescent target. Thus, the photoluminescent coating (208) is substantially equally affected by temperature across the entire photoluminescent target (200). Accordingly, regardless of the exact interrogation location on the photoluminescent target (200), a substantially equal temperature reading may be obtained. The skeleton structure material may be a metal, e.g., aluminum, copper, or any other thermally conductive material. The skeleton structure may be woven, cast, stamped or machined to create a uniform skeleton. The skeleton structure (206) may be, for example, a mesh. Alternatively, the skeleton structure may be a surface of a solid material, e.g., a metal disk, with surface irregularities (e.g. perforations) that facilitate adherence of the photoluminescent coating (200). In one embodiment of the invention, the skeleton structure consists of particles (e.g., flakes or gains) that are mixed into the photoluminescent coating. In all cases, uniformity of the skeleton structure across the area of the photoluminescent target is desirable. As an alternative to the use of a dedicated skeleton structure, the surface of the substrate (202) may be manipulated (e.g., by machining, etching, electrical discharge machining, etc.) to obtain a surface texture that can be coated with the photoluminescent coating, thus providing the skeleton structure directly on the substrate surface. In such an embodiment, there may be no need for the skeleton structure (206).

The photoluminescent coating (208), in accordance with an embodiment of the invention, includes a photoluminescent material (210) that, upon receipt of excitation light, reemits light in a temperature-dependent manner. The photoluminescent material (210) may change, for example, emission decay times and/or emission line strengths in a temperature-dependent manner. Ruby, e.g. synthetic ruby, may be used to measure temperatures in a range of 0° C. to +1,400° C. Alternatively, a phosphor may be used, e.g., to measure temperatures in a range of −200° C. to +200° C. Those skilled in the art will recognize that other photoluminescent materials may be used and other temperature ranges may be considered, without departing from the invention. The intensity of the photoluminescence may be dependent on several factors in addition to temperature, including the photoluminescent particle concentration, the excitation light wavelength, intensity and/or exposure time and/or the concentration of optionally added emission inhibitors. The photoluminescent material (210) may be obtained as a powder that may be mixed with a binder (212) to form a paste or liquid.

The photoluminescent coating (208) may further include a binder (212). The binder (212) may be any kind of substance that enables the photoluminescent coating (208) to be applied to the skeleton structure (206) and that ensures that the photoluminescent coating adheres to the skeleton structure. The binder (212) may be, for example, an initially liquid or viscous, transparent organic or inorganic adhesive that is mixed with the photoluminescent material (210) to produce a paste. This paste, after application on the skeleton structure (206) may be cured to form a permanent photoluminescent coating (208) that encloses the skeleton structure (206). In the volume surrounding the skeleton structure, the photoluminescent coating is substantially evenly distributed. The curing of the binder (212) may occur under regular environmental conditions, e.g., at room temperature, or it may require the temporary application of heat, light (e.g., UV light), and/or radiation, etc. Additional details regarding the application of the photoluminescent coating are provided below in a description of the manufacturing process. Those skilled in the art will appreciate that a particular binder may be selected under consideration of the environmental conditions under which temperature measurements are to be performed. For example, the binder may be required to withstand the temperatures to be measured using the photoluminescent target.

Figure 3A:
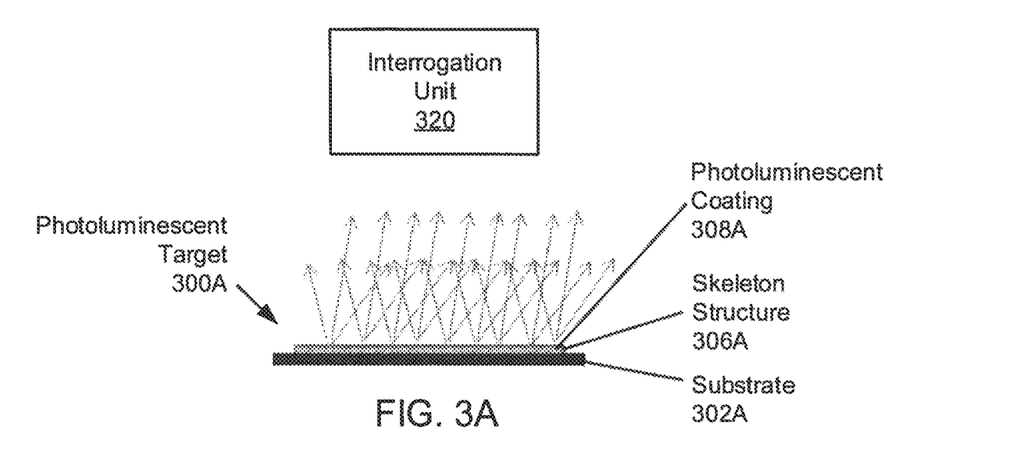
FIGS. 3A and 3B show possible shapes of photoluminescent targets, in accordance with one or more embodiments of the invention.
Figure 3B:
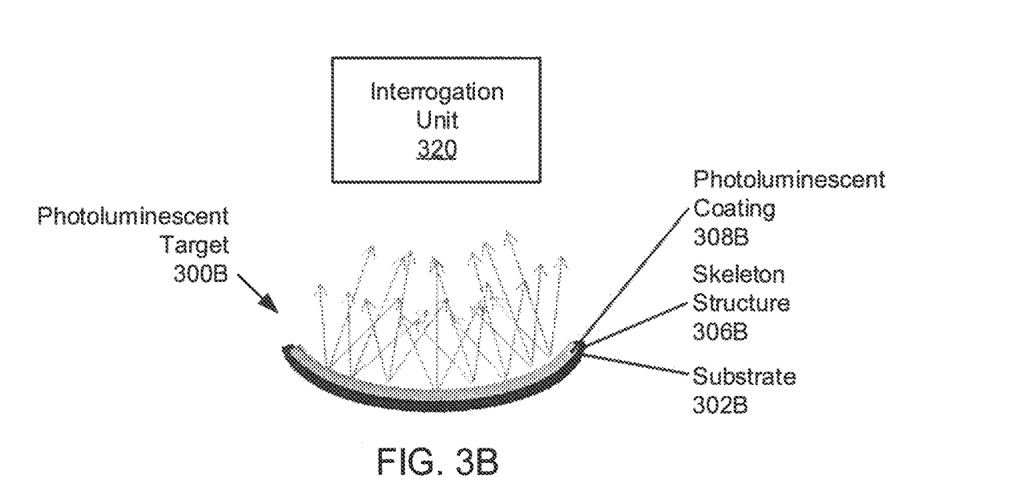

FIGS. 3A and 3B show possible shapes of photoluminescent targets, in accordance with one or more embodiments of the invention. FIG. 3A shows a flat-surfaced photoluminescent target (300A), which may be particularly suitable for installation on flat surfaces of a target body (not shown). The photoluminescent coating (308A) enclosing the skeleton structure (306A) and the substrate (302A) have a flat, disk-like shape. Re-emitted light may be returned to the interrogation unit (306), although the re-emitted light is not necessarily focused on the interrogation unit (320), and not all re-emitted light may thus be captured.

FIG. 3B shows a curved, e.g., parabolic, photoluminescent target (300B), which may be particularly suitable in applications where the collection of a high amount of re-emitted light by the interrogation unit (320) is desirable. The curved surface of the parabolic photoluminescent target (300B) directs the re-emitted light to a central zone where it may be gathered by the optics of the interrogation unit (320). A stronger, lower-noise temperature signal may, thus, be obtained. The photoluminescent coating (308B) enclosing the skeleton structure (306B) and the substrate (302B) have a parabolic shape. A thermally conductive adapter piece (not shown) may be used to attach the parabolic photoluminescent target (300B) to surfaces of any shape. Alternatively, the substrate (302B) itself may serve as an adapter. For example, one side of the substrate may have a parabolic shape to accommodate the parabolic photoluminescent coating (308B) enclosing the skeleton structure (306B), and the other side of the substrate may be flat to be interfaced with a flat-surfaced target body.

FIGS. 4A-4E describe the manufacturing of a photoluminescent target, in accordance with one or more embodiments of the invention. While FIGS. 4A-4D show the photoluminescent target at various stages of the manufacturing, FIG. 4E describes the manufacturing process, with reference to FIGS. 4A-4D.

Figure 4A:
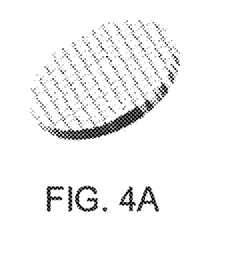
FIGS. 4A 4E describe the manufacturing of a photoluminescent target, in accordance with one or more embodiments of the invention.
Figure 4B:
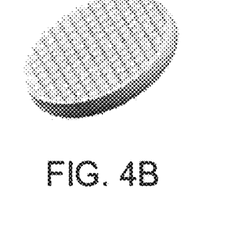
Figure 4C:
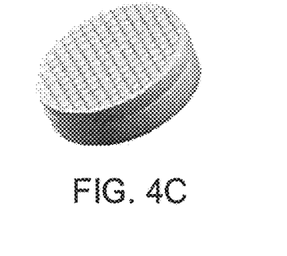
Figure 4D:
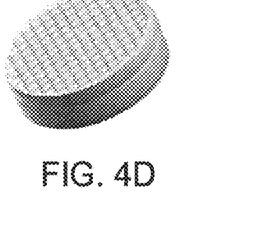
Figure 4E:
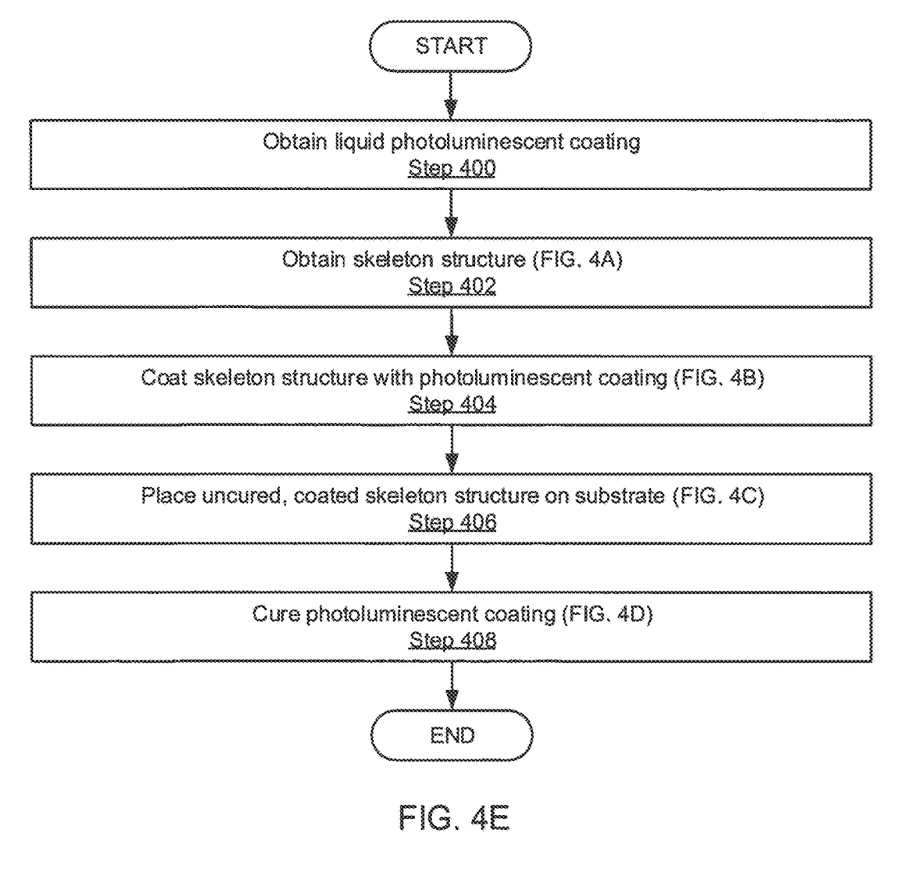

Turning to FIG. 4E, in Step 400, a liquid photoluminescent coating is obtained. The liquid photoluminescent coating may be a mix of a photoluminescent material, obtained in powder form, and a binder obtained in liquid form.

In Step 402, a skeleton structure is obtained. As previously described, the skeleton structure may be a skeleton-like structure that supports equalization of the temperature across the surface of the photoluminescent target. The skeleton structure may be of any geometry e.g., round, rectangular, etc., and may be obtained by cutting (e.g., manually cutting, laser cutting, plasma cutting, etc.) or punching the structure from a larger sheet of, for example, a wire mesh screen or any other alternative sheet-like material with the desired characteristics. FIG. 4A shows the skeleton structure Obtained after completion of Step 402. If a curved skeleton structure, such as shown in FIG. 3B, is desired, a forming process, such as for example stamping, may be included in Step 402

In Step 404, the skeleton structure is coated with liquid photoluminescent coating. The viscosity of the liquid photoluminescent coating may be chosen to be suitable for the coating process to be used. The coating may be performed by dipping, painting, or spraying, or using any other operation for depositing the photoluminescent coating on the skeleton structure. FIG. 4B shows the coated skeleton structure obtained after completion of Step 404.

In Step 406, the coated skeleton structure is placed on the substrate, prior to the curing of the binder in the photoluminescent coating. The uncured binder comes in contact with the substrate and thus forms an interface with the substrate. FIG. 4C shows the skeleton structure after the placement on the substrate, performed in Step 406.

In Step 408, the binder in the photoluminescent coating is cured to obtain a non-liquid photoluminescent coating. Curing may be performed as needed and may involve air-drying, exposure to high temperatures, radiation, UV light, etc. FIG. 4D shows the photoluminescent target after completion of Step 408. The photoluminescent target may be ready to be attached to the surface of a target body.

The manufacturing method described in FIGS. 4A-4E may be particularly suitable to produce small quantities of photoluminescent targets.

A modified manufacturing process may be employed to obtain a curved photoluminescent target. Specifically, the curved skeleton structure, obtained in Step 402, may be used in conjunction with a substrate that includes a cavity configured to accommodate the curved photoluminescent target. The uncoated skeleton structure may be placed into the cavity, and subsequently the coating may be performed, followed by the curing of the photoluminescent coating.

Further, another modified manufacturing process may be relied upon in embodiments in which the photoluminescent coating is directly applied to the substrate. As previously described, the surface of the substrate may be treated to obtain a texture that facilitates adherence to the substrate. The liquid photoluminescent coating, obtained in Step 400, may, thus, be applied directly to the substrate, and subsequently the photoluminescent coating may be cured, as described in Step 408.

Figure 5A:
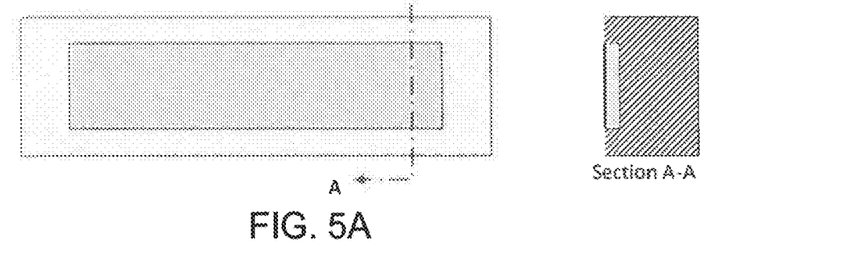
FIGS. 5A-5D describe the manufacturing of photoluminescent targets, in accordance with one or more embodiments of the invention.
Figure 5B:
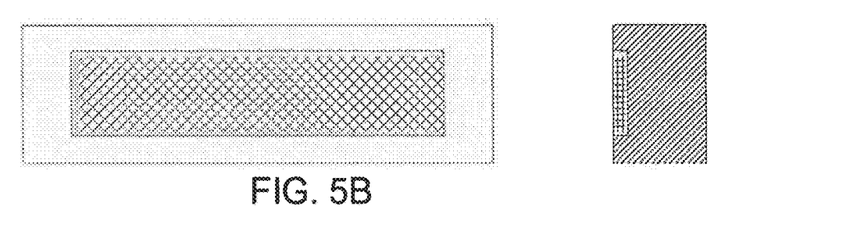
Figure 5C:
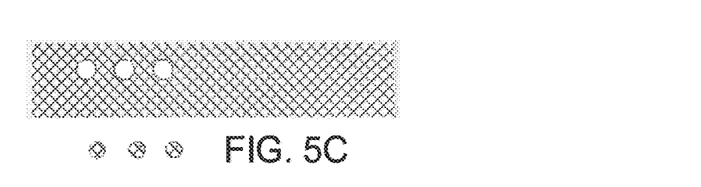

FIGS. 5A-5D describe the manufacturing of photoluminescent targets, in accordance with one or more embodiments of the invention. While FIGS. 5A-5C show the manufacturing at various stages, FIG. 5D describes the manufacturing process, with reference to FIGS. 5A-5C.

Figure 5D:
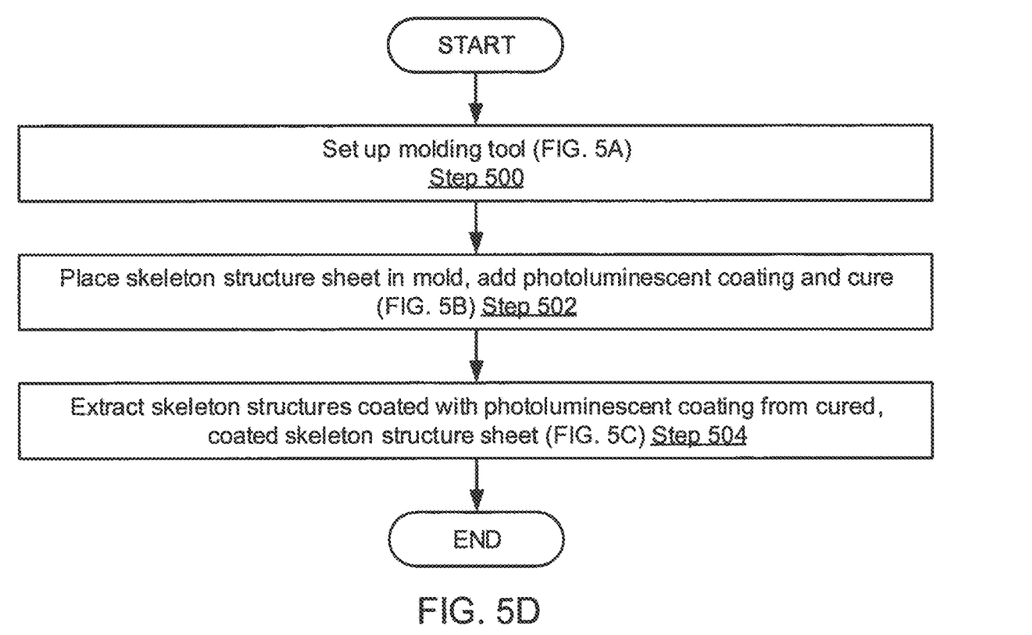

Turning to FIG. 5D, in Step 500, a molding tool is set up. The molding tool, shown in FIG. 5A, includes a cavity configured to accommodate a sheet of skeleton structure material. Accordingly, the recess is sized to accommodate the sheet. Alternatively, the skeleton structure may be formed by particles injected into the mold. Depending on the desired thickness of the photoluminescent target to be manufactured, an appropriate depth of the mold may be selected. The mold may be designed such that it can withstand the environmental conditions required for curing the binder in the photoluminescent coating, as further described below. For example, if the curing of the binder requires high temperatures, the mold is made from a material that can withstand these high temperatures.

In Step 502, the sheet of skeleton structure material is placed into the mold, and the liquid photoluminescent coating is added, as illustrated in FIG. 5B. Subsequently, the binder in the photoluminescent coating is cured. A curing method, appropriate for the binder is selected, as previously described.

In Step 504, after ejection of the sheet of skeleton structure, coated with cured photoluminescent coating, from the mold, skeleton structures of the desired size are extracted from the sheet. The extraction may be performed using punching or cutting operations, as previously described. The extraction of circular skeleton structures is illustrated in FIG. 5C.

Step 504 may be unnecessary if, in a variation of the molding technique, individual pre-cut skeleton structure pieces (or alternative skeleton structure materials) are placed in a molding tool whose cavities are shaped to yield finished parts ready for fixing to the substrate without further sizing steps.

The manufacturing method described in FIGS. 5A-5D may be particularly suitable to produce large quantities of photoluminescent targets. The photoluminescent targets do not yet include a substrate and may thus be mounted either directly on a target body surface or on a substrate, using a thermally conductive adhesive.

Figure 6A:
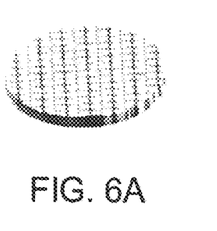
FIGS. 6A 6E describe the manufacturing of a photoluminescent target, in accordance with one or more embodiments of the invention.

FIGS. 6A-6E describe the manufacturing of a photoluminescent target, in accordance with one or more embodiments of the invention. While FIGS. 6A-6D show the photoluminescent target at various stages of the manufacturing, FIG. 6E describes the manufacturing process, with reference to FIGS. 6A-6D, Turning to FIG. 6E, in Step 600, a skeleton structure is obtained. As previously described, the skeleton structure may be a skeleton-like structure that supports equalization of the temperature across the surface of the photoluminescent target. The skeleton structure may be of any geometry e.g., round, rectangular, etc., and may be obtained by cutting (e.g., manually cutting, laser cutting, plasma cutting, etc.) or punching the structure from a larger sheet of, for example, a wire mesh screen or any other alternative sheet-like material with the desired characteristics. FIG. 6A shows the skeleton structure obtained after completion of Step 600.

Figure 6B:
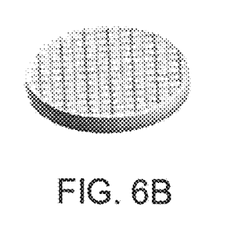

In Step 602, the skeleton structure is coated with photoluminescent coating. The photoluminescent coating may include the photoluminescent material and a binder and may be of a viscosity suitable for the chosen coating process. The coating may be performed by dipping, painting or spraying, or using any other operation for depositing the photoluminescent coating on the skeleton structure. Further, the photoluminescent coating is cured. Curing may be performed as needed and may involve air-drying, exposure to high temperatures, radiation, UV light, etc. FIG. 6B shows the skeleton structure after curing of the photoluminescent coating. If a curved skeleton structure is being coated, the coating may be performed in a mold that accommodates the curved skeleton structure. The mold may be configured to hold the liquid photoluminescent coating in the vicinity of the curved skeleton structure until the binder of the photoluminescent coating has cured.

In one embodiment of the invention, the skeleton structure after curing of the photoluminescent coating, shown in FIG. 6B, may be obtained using the method described with reference to FIGS. 5A-5D. In this case, Steps 600 and 602 may be skipped.

Figure 6C:
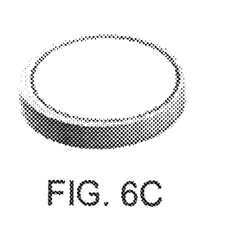

In Step 604, the substrate is coated with an adhesive. Any type of organic or inorganic adhesive may be used. The adhesive may be thermally conductive. FIG. 6C shows the substrate coated with the adhesive.

In Step 606, the skeleton structure coated with the cured photoluminescent coating is placed on the substrate, in contact with the adhesive. The adhesive may be cured either actively (exposure to heat, radiation, etc.) or passively by air-drying. The adhesive may be transparent or non-transparent.

Figure 6D:
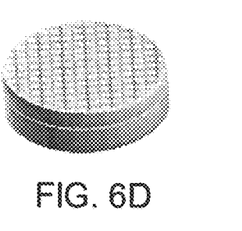
Figure 6E:
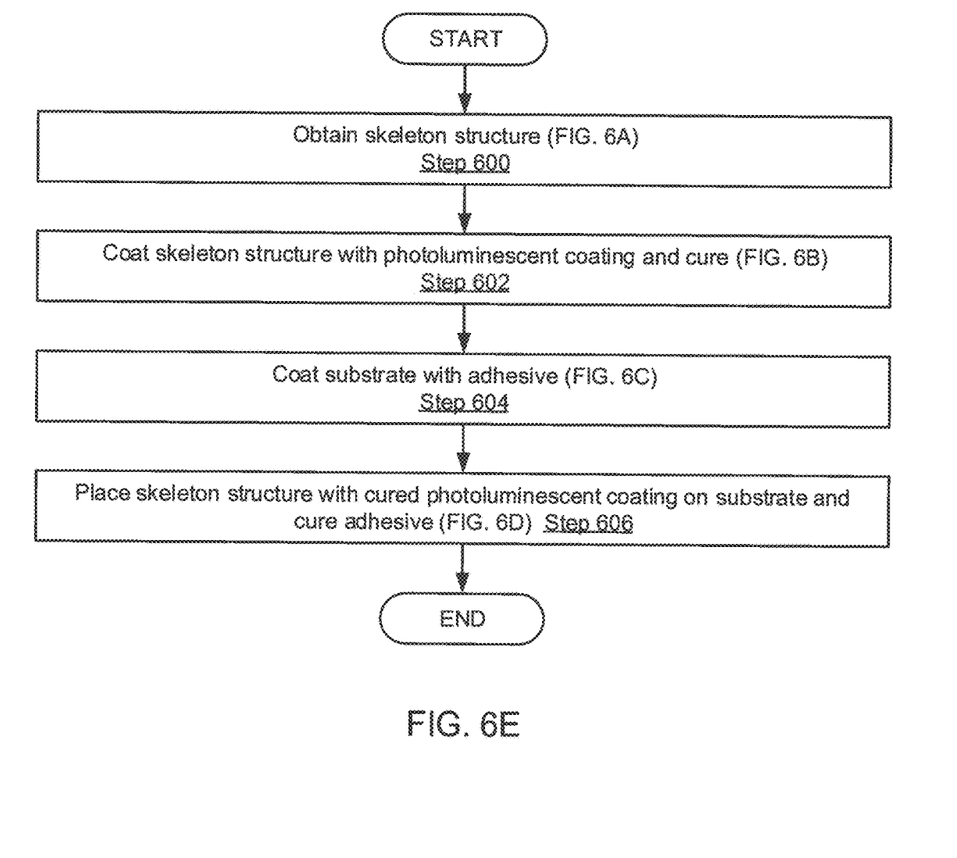

FIG. 6D shows the photoluminescent target after completion of Step 606. The photoluminescent target may be ready to be attached to the surface of a target body.

The manufacturing method described in FIGS. 6A-6E may be particularly suitable to produce small quantities of photoluminescent targets. The manufacturing method further provides additional flexibility. Specifically, the skeleton structure coated with the cured photoluminescent coating, obtained after completion of Step 602 (FIG. 6B), may be placed directly on a target body, and Steps 604 and 606 may thus be skipped.

Embodiments of the invention may enable reliable and accurate temperature measurements over broad ranges of temperatures. Specifically, embodiments of the invention enable the manufacturing and use of photoluminescent targets that have a high degree of thermal uniformity. The thermally conductive skeleton structure embedded in the photoluminescent targets may ensure that temperature gradients across the photoluminescent targets are reduced or avoided. Accordingly, local temperature aberrations that may result in temperature measurement errors may be avoided. Further, the conductive skeleton is suitable for high temperature environments, and the photoluminescent target may thus also be used in high-temperature environments. Various embodiments of the invention may be manufactured efficiently. Manufacturing processes that may be suitable for the production of larger and smaller quantities are described. Because uniformity of the manufactured photoluminescent targets may be high, part-to-part variation may be low, and accordingly the production yield, using the manufacturing processes in accordance with one or more embodiments of the invention may be high.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for obtaining temperature measurements, the system comprising:
   a photoluminescent target comprising:
      a photoluminescent coating that, when exposed to excitation light received from an interrogation unit, reemits light in a temperature-dependent manner; and
      a thermally conductive skeleton structure configured to:
         establish an even temperature distribution across the photoluminescent target; and
         provide a support matrix for the photoluminescent coating that surrounds the skeleton structure,
      wherein the photoluminescent target thermally interfaces with a target body from which the temperature measurement is to be obtained, and
      wherein the interrogation unit obtains a temperature measurement based on the reemitted light.

2. The system of claim 1, wherein the photoluminescent coating comprises:
   a photoluminescent material; and
   a binder,
   wherein the binder establishes a volume in the vicinity of the skeleton structure, in which the photoluminescent material is substantially evenly distributed.

3. The system of claim 2, wherein the photoluminescent material is one selected from a group consisting of a fluorescent and a phosphorescent substance.

4. The system of claim 1 further comprising a substrate, wherein the skeleton structure, enclosed by the photoluminescent coating, is disposed on the substrate, and wherein the substrate forms a thermally conductive interface to the target body.

5. The system of claim 4, wherein an adhesive fixates the skeleton structure, enclosed by the photoluminescent coating, on the substrate.

6. The system of claim 4, wherein a binder in the photoluminescent coating adhesively fixates the skeleton structure, enclosed by the photoluminescent coating, on the substrate.

7. The system of claim 1, further comprising a substrate, wherein a surface texture of the substrate provides the skeleton structure, and wherein the substrate forms a thermally conductive interface to the target body.

8. The system of claim 1, wherein an adhesive fixates the skeleton structure, enclosed by the photoluminescent coating, on the target body.

9. The system of claim 1, wherein the skeleton structure is one selected from a group consisting of a woven mesh, a cast grid, a stamped grid, a machined grid and a perforated disk.

10. The system of claim 1, wherein the photoluminescent target is parabolic, configured to focus the re-emitted light on optics of the interrogation unit.

* * * * *